United States Patent [19]

Swanson

[11] Patent Number: 4,601,108

[45] Date of Patent: Jul. 22, 1986

[54] SPACER DEVICE

[76] Inventor: Neubert W. Swanson, Box 510, Moose Lake, Minn. 55767

[21] Appl. No.: 664,522

[22] Filed: Oct. 25, 1984

[51] Int. Cl.[4] .......................... B43L 7/06; G01C 3/00

[52] U.S. Cl. ....................................... 33/454; 33/1 K; 33/277

[58] Field of Search ...................... 434/91, 92; 33/454, 33/192, 277, 403, 456, 1 K, 482

[56] References Cited

U.S. PATENT DOCUMENTS

| | | | |
|---|---|---|---|
| 927,790 | 7/1909 | Hall | 33/407 |
| 1,622,229 | 3/1927 | Ormiston | 33/277 |

FOREIGN PATENT DOCUMENTS

| | | | |
|---|---|---|---|
| 345507 | 12/1921 | Fed. Rep. of Germany | 33/451 |
| 11970 | of 1884 | United Kingdom | 33/277 |

*Primary Examiner*—Harry N. Haroian
*Attorney, Agent, or Firm*—Herman H. Bains

[57] ABSTRACT

A spacer device for use in placing contour lines between known points of elevation when plotting stadia, in spacing of architectural units, and in making perspective drawings, includes a parallelogramic frame comprising a plurality of frame elements pivotally connected together at their respective ends. A single elongate filament is threaded through openings in an opposed pair of frame elements to arrange the filament in parallel equally spaced apart spacer elements. The spacing between adjacent spacer elements may be readily selectively varied by adjusting the parallelogramic frame to thereby facilitate interpolation when using the spacer device to make topographical contour maps, and the like.

2 Claims, 4 Drawing Figures

SPACER DEVICE

This invention relates to a spacer device for use in placing contour lines between known points of elevation when plotting stadia, in the spacing of architectural units, and in making perspective drawings.

When using the stadia method of making a topographical contour map, engineers and surveyors have experienced difficulty in interpolating to find the positions of the even feet between elevation points. Although certain devices have been developed for the purpose of reducing the problem in interpolating, certain of these prior art devices are of expensive construction and experience problems in usage. One such prior art device is disclosed in German Pat. No. 806,289, which discloses a spacer device which is generally similar to that of applicant's and includes a frame having a plurality of spacer or divider elements mounted on the frame. In the German patent, the spacer or divider elements are connected by small springs to the frame, which increases the cost of the device and sometimes results in improper functioning.

It is a general object of this invention to provide a spacer device, of simple and inexpensive construction, which enables a user to make accurate interpolations, even on small scale maps.

A more specific object of this invention is to provide a novel spacer device utilizing a parallelogramic frame and a single elongate filament which is threaded through openings and extends between the opposite frame elements so that the filament is arranged in parallel equally spaced apart divided elements, the spacing between adjacent spacer elements being readily adjustable to facilitate interpolation when making a topographical contour map or the like. These and other objects of the invention are more fully defined in the following specification.

FIGURES OF THE DRAWING

DESCRIPTION OF THE PREFERRED EMBODIMENT

Figure 1:
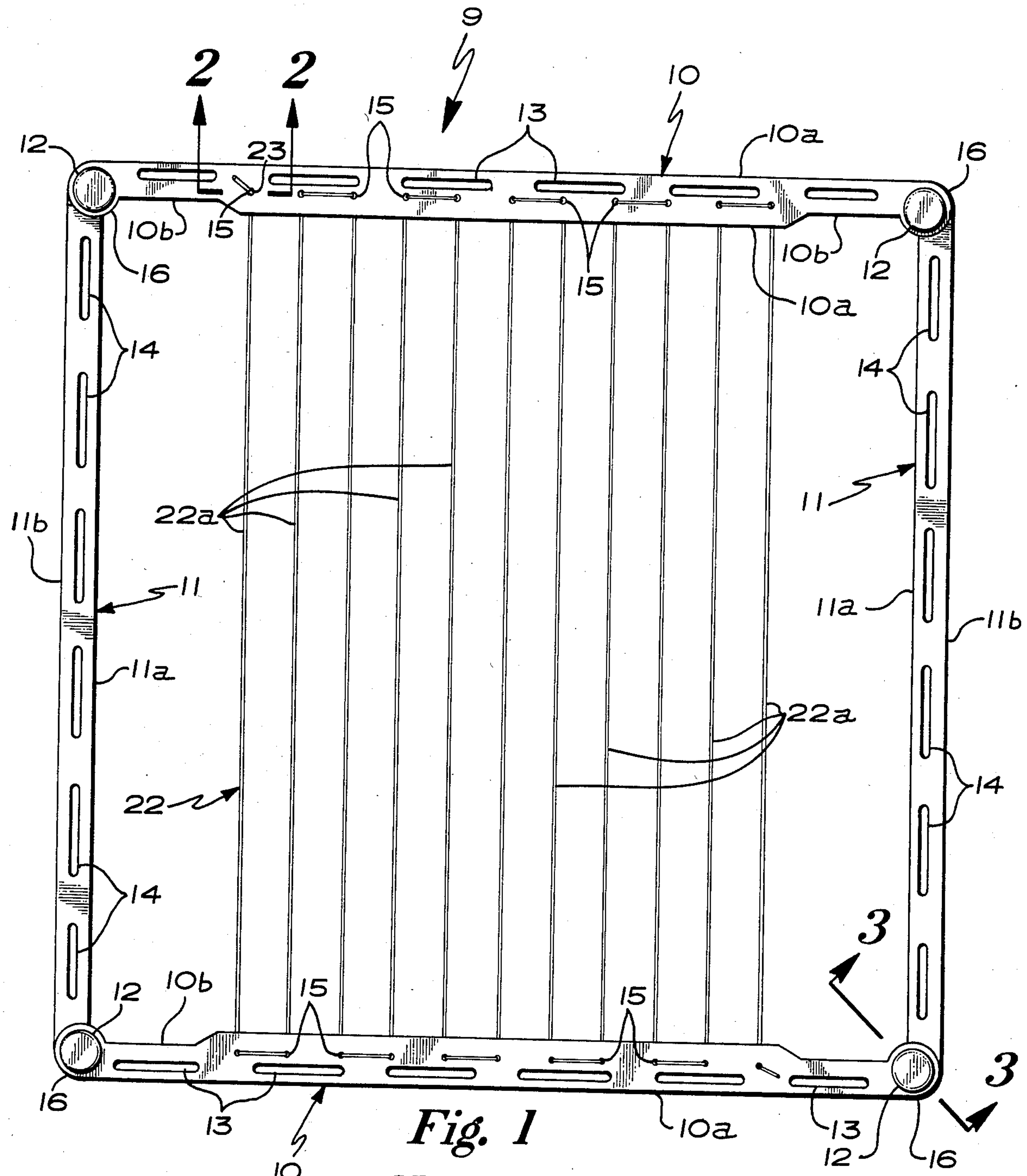
FIG. 1 is a plan view of the spacer device.

Referring now to the drawings and, more specifically, to FIG. 1, it will be seen that one embodiment of the novel spacer device, designated generally by the reference numeral 9, is thereshown. The spacer device 9 comprises a parallelogramic frame F which includes a pair of opposed rigid frame members 10 and a pair of opposed rigid frame members 11 which are pivotally connected at their respective ends by pivot 12. It is pointed out that the frame members 10 and the frame members 11 are formed of a suitable plastic material which is shaped in a molding operation. Similarly, the pivot 12 is also formed of the same kind of plastic material of which the frame members are formed.

In the embodiment shown, the frame members 10 have a plurality of elongate longitudinally spaced apart openings 13 therein. The frame members 11 also have a plurality of elongate longitudinally extending spaced apart openings 14 therein.

In the embodiment shown, the inner longitudinal surface 11*a* of each frame member 11 is disposed in substantially parallel relation with the latter longitudinal surface 11*b* thereof. It will, therefore, be seen that the frame members 11 are each of uniform width throughout substantially their entire lengths. However, it will be noted that the width dimension of the frame members 10 is non-uniform throughout the length of the frame members. The central portion 10*a* has a width dimension greater than the width dimension of the end portions 10*b*. The outer face 10*c* is substantially straight and parallel to the inner face defining the central portion 10*a* and the end portion 10*b*. It will further be noted that the central portion 10*a* has a length dimension which corresponds to a major portion of the length dimension of each frame member 10. The central portion 10*a* of each frame member 10 also has a plurality of longitudinally spaced apart openings 15 therethrough. It will be noted that the openings 15 in each of the frame members 10 are equally spaced apart.

Figure 3:
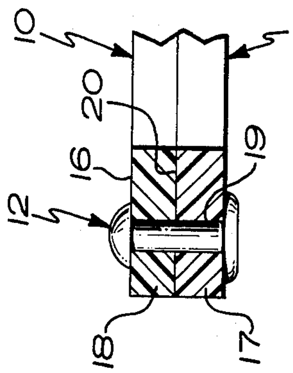
FIG. 3 is a cross-sectional view taken approximately along the line 3—3 of FIG. 1 and looking in the direction of the arrows.

Referring now to FIG. 3, it will be seen that the pivot 12 actually comprises a rivet which extends through openings in the associated frame members 10 and 11. In this regard, it will be noted that opposite end portions 16 of each frame member 10 are of enlarged circular configuration whose thickness dimension is approximately one-half the thickness dimension of the frame member 10. Similarly, opposite end portions 17 of each frame member 11 are also of enlarged circular configuration whose thickness dimension is approximately one-half the thickness dimension of the frame member 11. Each circular portion 16 of each frame member 10 has an opening 18 therethrough and the circular portions 17 of each frame member have openings 19 therethrough. The pivot 12 extends through the openings in mating circular end portions 16 and 17 to effectively secure each frame member 10 to a frame member 11. Each circular end portion 16 defines a face 20 which is disposed in contacting relation with the face 21 defined by a circular end portion 17. It will, therefore, be seen that the parallelogramic frame 9 may be shifted to a plurality of adjusted positions about the pivots 12. When the frame is shifted to a predetermined position, the frictional engagement between the faces 20 and 21 will retain the frame in the adjusted position until it is shifted to a new position.

A single very thin, fine flexible filament 22 is successively threaded through the openings 15 in the frame members 10, as shown, to provide eleven parallel equally spaced taut divider or spacer elements 22*a*. Although eleven spacer elements 22*a* are illustrated on the embodiment shown, it will be appreciated that the number of spacer elements 22*a* may be varied as desired.

Figure 2:
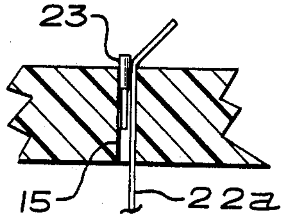
FIG. 2 is a cross-sectional view taken approximately along the line 2—2 of FIG. 1 and looking in the direction of the arrows and illustrating the manner in which the thread or divider element is anchored to the frame.

Referring now to FIG. 2, it will be seen that the opposite ends of the single continuous filament 22 are anchored by anchoring elements 23. The anchoring elements 23 comprise small plugs formed of plastic material which are wedged against the end portions of the filament 22 in the openings 15. In the embodiment shown, one end of the filament is anchored on one of the frame members 10 and the other end of the filament is anchored on the other frame member 10.

It will be noted that the centers of the openings 15 of each frame member 10 lie in a single line which also passes through the center of the pivots 12. This permits the tautness of each divider element 22*a* and permits the spacer device to be readily shifted to adjusted positions. It will also be appreciated that, when each frame member of the parallelogramic frame is arranged in substantially right angular relation with an adjacent frame member, the spacing between the spacer elements 22 is at its maximum. However, when adjacent frame members are shifted out of right angular relationship with respect to each other, the spacing may be progressively decreased between adjacent spacer elements 22*a*.

To divide a given distance or line into a number of equal spaces, the frame is adjusted until two spacer elements 22*a*, which encompass a number of spaces, are in alignment with terminal points of the distance or line to be divided. Smaller spaces are obtained by partially closing the frame or shifting the frame so that adjacent frame members are progressively shifted away from right angular relation. Therefore, for example, if a line is to be divided by the spacer device into ten equal spaces, the spacing is accomplished by shifting the frame until the outermost spacer elements 22*a* are in alignment with the respective ends of the line. It will be appreciated that if a line to be divided is greater than the distance between the two outermost spacer elements when the frame is in its fully opened position, then the frame may be shifted so that the spacer elements 22 are shifted from a normal or perpendicular relation with respect to the frame members 10 to a more angular position with these frame members. This reduces the spacing between adjacent spacer elements to permit larger lines to be divided into equal increments.

As pointed out above, the frictional engagement of the contacting faces between each frame member 10 and each frame member 11 permits the spacer device to be retained in an adjusted position. The coefficient friction of the plastic material employed permits the frame members to be retained in a selected position until forcibly shifted to a new position.

Figure 4:
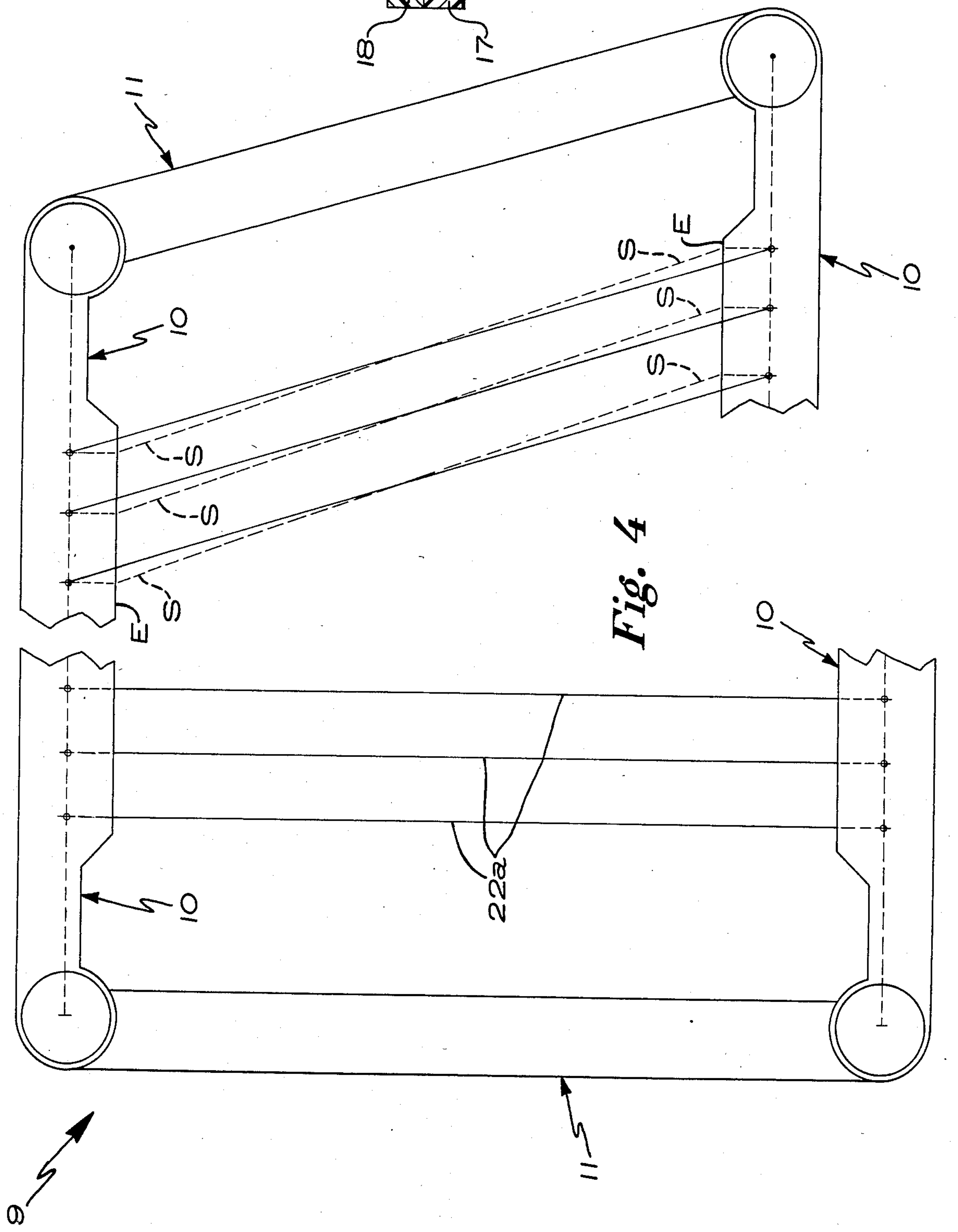
FIG. 4 is a diagrammatic view contrasting the spacer device of the present invention with a prior art device to illustrate the problems associated with the construction of the prior art device.

Referring now to FIG. 4, it will be seen that the spacer device 9 has contrasted with a prior art spacer device D. In the prior art spacer device D, the connection between the spacer elements S and frame member M does not lie in a line which passes through the center of the pivot P between adjacent frame members M. This arrangement interferes with shifting of the frame to selected positions. This is in sharp contrast to applicant's spacer device where the anchor points of the filament lie in a line which passes through the center of the pivots between the frame members.

In FIG. 4, only the spacer elements S, depicted in dotted line configuration, represent the manner in which these spacer elements are connected to the frame members. On the left hand side of FIG. 4, each spacer element of the prior art spacer device is coincident with the spacer elements 22*a* of the present invention. However, on the right hand side of FIG. 4, the prior art spacer elements S are connected or anchored to opposed frame members at the inner edge E of the frame members 10, rather than at points which lie in a line that passes through the center of the pivots 12. It will, therefore, be seen that when the spacer device is adjusted using the prior art arrangement, the movement of the spacer device is hampered because the connection with the frame members is not located at points which lie in a line passing through the center of the pivots 12. Movement of the spacer elements S of the prior art spacer device interferes with the movement of the frame members to adjusted positions when the connection of the spacer elements with the frame does not lie within a line which passes through the center of the pivots 12. However, in the spacer device of the present invention, the movement of the spacer elements 22*a* to any adjusted position may be readily and smoothly accomplished because the pivot connection of each spacer element with the frame does lie in a line which passes through the center of the pivots 12.

It is important and desirable to use a single filament which is formed of flexible material so that damage to the filament merely requires replacement by the user. Removal of the damaged filament and replacement thereof can be readily accomplished by merely threading filament 22 through the openings 15 and frame members 10.

It will, therefore, be seen that I have provided a novel spacer device, which is not only of simple and inexpensive construction, but one which functions in a more efficient manner than any heretofore known comparable spacer device.

What is claimed is:

1. A spacer device comprising:

a parallelogramic frame including opposed pairs of elongate frame members, opposite end portions of each frame member being of enlarged circular configuration, said enlarged circular end portions having a thickness dimension approximately one-half of the thickness dimension of the associated frame member, said enlarged circular end portion of one frame member engaging the enlarged circular end portion of the adjacent frame member, one opposed pair of said frame members each including a central portion having a width dimension greater than the width dimension of those portions located between the central portion and the circular end portions, means pivotally connecting the inter-engaging enlarged circular end portions of adjacent frame members together for relative pivotal movement therebetween, said one opposed pair of said frame members each having a plurality of longitudinally spaced apart openings in the central portion thereof having the greater width dimension, said openings in each of said frame members lying in a line passing through the centers of the pivot means which pivotally connect each of said frame members to the adjacent frame members, an elongate flexible filament formed of plastic material and having one end thereof extending through the endmost opening in one of said one opposed pair of frame members and being threaded through said openings to provide a plurality of parallel equally spaced apart spacer elements which are disposed in substantilly parallel relation with each other and the other of said pair of frame members, said filament having its other end projecting through the endmost opening of the other of said one opposed pair of frame members, a pair of plug elements projecting into said endmost openings engaging the respective ends of said filament to anchor the same therein, the spacing between said spacer elements being readily adjusted upon pivoting of the frame members of said parallelogramic frame to shift the latter between a rectangular configuration to a configuration wherein the frame members lie in substantially side-by-side contiguous relationship to thereby permit the device to be used in visually measuring sizes of structural forms.

2. The spacer device as defined in claim 1 wherein the spacing between each endmost spacer element and the associated frame member of the other pair of frame members is substantially greater than the spacing between adjacent spacer elements.

* * * * *